(12) United States Patent
Zhou et al.

(10) Patent No.: US 6,340,083 B1
(45) Date of Patent: Jan. 22, 2002

(54) TRANSMISSION WHEEL AND A PLATFORM TRANSMISSION APPARATUS FORMED BY SAID WHEELS

(75) Inventors: Yuanda Zhou; Li Han; Jack Zhang; James Xue; Mike Xiang; Kun Bao, all of Shenzhen (CN)

(73) Assignee: Shenzhen CIMC-Tianda Airport Support Ltd., Shenzhen (CN)

( * ) Notice: Subject to any disclaimer, the term of this patent is extended or adjusted under 35 U.S.C. 154(b) by 0 days.

(21) Appl. No.: 09/420,547

(22) Filed: Oct. 26, 1999

(51) Int. Cl.$^7$ .............................................. B65G 47/10
(52) U.S. Cl. ............................ 198/370.09; 193/35 MD
(58) Field of Search ........................ 198/370.09, 371.3, 198/457.02, 787; 193/35 MD

(56) References Cited

U.S. PATENT DOCUMENTS

| | | | |
|---|---|---|---|
| 2,233,733 A | * 3/1941 | Clouse ........................ 248/251 |
| 3,710,917 A | * 1/1973 | Black et al. ........... 198/370.09 |
| 4,978,272 A | * 12/1990 | Leon .......................... 414/529 |
| 4,981,209 A | * 1/1991 | Sogge ............... 193/35 MD X |
| 5,013,204 A | * 5/1991 | Leon .......................... 414/347 |
| 5,028,054 A | * 7/1991 | Peach ........................... 277/57 |
| 5,044,490 A | * 9/1991 | East ............................ 198/830 |
| 5,396,977 A | * 3/1995 | Lantis et al. ............. 198/371.3 |

OTHER PUBLICATIONS

"Commander 15 Container/Pallet Loader"; Jan., 1995; FMC Airline Equipment Division, pp. 13–18.*
"Commander 15 Container/Pallet Loader Section 2 Adjustment Procedures"; Dec., 1994; FMC Airline Equipment Division.*
"Commander 15 Container/Pallet Loader"; Jun., 1995; FMC Airline Equipment; Heli Roll Casting Repair.*

* cited by examiner

Primary Examiner—James R. Bidwell
(74) Attorney, Agent, or Firm—Cohen, Pontani, Lieberman & Pavane

(57) ABSTRACT

A transmission wheel for a platform transmission apparatus includes a wheel frame having a disk with a central hole for fixing to a drive axle, and a plurality of ball rollers carried on each side of the disk by supports which extend axially. The ball rollers on each side of the disk each have a circular arc camber which lies on a common circle concentric to the axis, the rollers on each side being evenly spaced apart and staggered from the rollers on the other side. The supports include concave portions which correspond to the circular arc camber and also enhance the rigidity of the wheel frame.

12 Claims, 7 Drawing Sheets

US 6,340,083 B1

TRANSMISSION WHEEL AND A PLATFORM TRANSMISSION APPARATUS FORMED BY SAID WHEELS

FIELD OF THE INVENTION

The present invention relates to a transmission wheel and a transmission apparatus formed by said wheel, and particularly to a transmission wheel and the transmission apparatus formed by the transmission wheels applied in the elevating transport platforms and transmission platforms of cargo handling systems for aircraft.

BACKGROUND OF THE INVENTION

In cargo handling systems, conveyer belt, transmission platforms and air cargo transportation loaders are generally involved, usually there are one or several transmission platforms in such a system. While in the process of cargo transmission, the platforms bearing containers or container plates are required to accomplish a plurality of transmission functions. For instance, a longitudinal transmission, a transmission in a linear direction, is the major direction in transmission movement; a lateral transmission, which is a left and right transmission movement, is inevitable in a transmission process; a rotating transmission or oblique transmission, for turning over the direction, is sometimes applied for adjustment of cargo situation; or carrying out above movements simultaneously. Consequently, to perform above movements, at least several sets of mechanisms are required in general platform design, i.e., a longitudinal transmission mechanism, a lateral transmission mechanism, and a rotating transmission mechanism. Most of air cargo transportation loaders in current use have several layers in structure to realize above functions, that is, when a longitudinal transmission is needed, a longitudinal mechanism is lifted; when a lateral transmission is needed, a lateral mechanism is lifted; and when a rotating transmission is needed, a rotating mechanism is lifted. Not only an extremely complicated mechanism is required in such a structure, but also because it is time consuming; the apparatus of prior art has a lower efficiency. At present, a better design is a HeliRoll 8 disclosed in U.S. Pat. No. 4,978,272 which is able to accomplish above operations, as shown in FIG. 1A. The transportation loader of the above-mentioned U.S. Patent has a transmission apparatus divided into several sets in a same plane, e.g. typically divided into four sets and has the HeliRoll 8 in two adjacent sets arranged oppositely in rotating direction so as to accomplish the above movements via mutual cooperation of the wheel sets, as shown in FIG. 1B; thereby the structure is greatly simplified. However the friction of such a HeliRoll 8 against the bottom of a container or plate is relative greater; on the other hand, it can be seen in the drawing that more than two sets of HeliRolls are required in cargo transmission along any direction for all transmission apparatus formed by the HeliRolls, which are power consuming. For example, when the sets of X1 and X2 or Y1 and Y2 rotating respectively in relative manner, the platform shall be transmitted along a direction of arrow YL or YR; and when the sets of X1 and Y1 or X2 and Y2 rotating in relative manner, the platform shall be transmitted along a direction of an arrow XB or XF. In addition, the above combination of wheels of the prior art tend to slip when the surface of the platform covering ice and snow.

SUMMARY OF THE INVENTION

It is an object of the present invention to provide a transmission wheel used for platform transmission; the transmission wheel can be used both for power transmission and for supporting a container or a container plate by several ball rollers mounted on both sides of a wheel frame.

It is a further object of the present invention to provide a transmission apparatus for platform transmission, the apparatus can make use of the transmission wheel both for power transmission and support purposes to realize transmission along a linear direction via the movements of a set of wheels.

In order to realize the above objects, the present invention provides a transmission wheel comprising a wheel frame centered with a hole, for fastening to a drive shaft and driving cargo, wherein at least two pivotable ball roller means are provided on the wheel frame, in which at least the first pivotable ball roller means comprises several ball rollers which are arranged on several supports protuberated from the wheel frame respectively via its axis, and evenly arranged along the circle of circular are camber of each ball roller;

at least the second pivotable ball roller means comprises several ball rollers which are arranged on several supports protuberated from the wheel frame respectively via its axis, evenly arranged along the circle of circular arc camber of each ball roller and staggered with the several ball rollers of the first means.

A transmission wheel according to the present invention, wherein the wheel frame centered with a hole comprises a wheel disk which is provided between the first and the second ball roller means.

A transmission wheel according to the present invention, wherein the supports of the first and the second ball roller means are integrated with the wheel frame.

A transmission wheel according to the present invention, wherein a concave portion corresponding to the circular arc camber of each ball roller, located at the back of each ball roller, is provided on the wheel disk.

A transmission wheel according to the present invention, wherein all circular arc cambers of the several ball rollers which are evenly staggered on two pivotable ball roller means form a circle.

A transmission wheel according to the present invention, wherein a circular arc diameter formed by the several ball rollers is greater than that of the wheel disk.

A transmission wheel according to the present invention, wherein each pivotable ball rollers means is provided with three ball rollers.

A transmission wheel according to the present invention, wherein a length of circular arc camber of each ball roller is one sixth of arc length of the circle in the wheel disk.

A transmission wheel according to the present invention, wherein the length of circular arc camber of each ball roller is greater than one sixth of arc length of the circle in the wheel disk.

A platform transmission apparatus for transmitting on multiple directions comprising a platform for bearing transmitted cargo;

a lift-up mechanism for lifting the platform to a suitable height;

a lateral transmission mechanism for lateral translation of the platform, comprising a plurality of motor-driven drive shafts on which a transmission wheel is provided by its wheel frame centered with a hole; and a longitudinal transmission mechanism for longitudinal translation of the platform, comprising a plurality of motor-driven drive shafts on which the transmission wheel is also provided, wherein at least two pivotable ball roller means are provided on the wheel frame, in which at least the first pivotable ball roller means comprises several ball rollers which are arranged on several supports protuberated from the wheel frame respectively via its axis, and evenly arranged along the circle of circular arc camber of each ball roller;

at least the second pivotable ball roller means comprises several ball rollers which are arranged on several supports protuberated from the wheel frame respectively via its axis, evenly arranged along the circle of circular arc camber of each ball roller and staggered with the several ball rollers of the first mean.

A platform transmission apparatus according to the present invention, wherein the wheel frame centered with a hole comprises a wheel disk which is provided between the first and the second ball roller means.

A platform transmission apparatus according to the present invention, wherein axes of the lateral transmission mechanisms and axes of the longitudinal transmission mechanisms are mutual perpendicularly installed.

According to an aspect of the invention, since several ball rollers are arranged along the circle of the wheel disk on both sides of a transmission wheel, it enables a transmission mechanism formed by the transmission wheels of the present invention to serve as a drive wheel taking the platform into action under motor driving; on the other hand, under unpowered condition, as a passive bearing wheel, can support a platform into action via a ball roller rotating around its self axis. Therefore, the present invention enables a container or container plate to be pressed a welldistributed force as the power is reasonably utilized, and the present invention avoid slippage occurred in transmission.

According to another aspect of the invention, since the above transmission wheel which is able to achieve both active and passive transmission has been employed in a transmission apparatus of the invention, the transmission mechanisms can be installed in a same plane. Thus it can be seen, adopting the invention, no complicated switching operation is needed, the structure is greatly simplified and raised the working efficiency; meanwhile transmission power being fully utilized, friction loss between a transmission apparatus and the bottom of the platform is reduced.

BRIEF DESCRIPTION OF THE DRAWINGS

The present invention will become more apparent as the disclosure of the present invention is made with reference to the accompanying drawings.

DETAILED DESCRIPTION OF THE PREFERRED EMBODIMENT

Figure 1A:
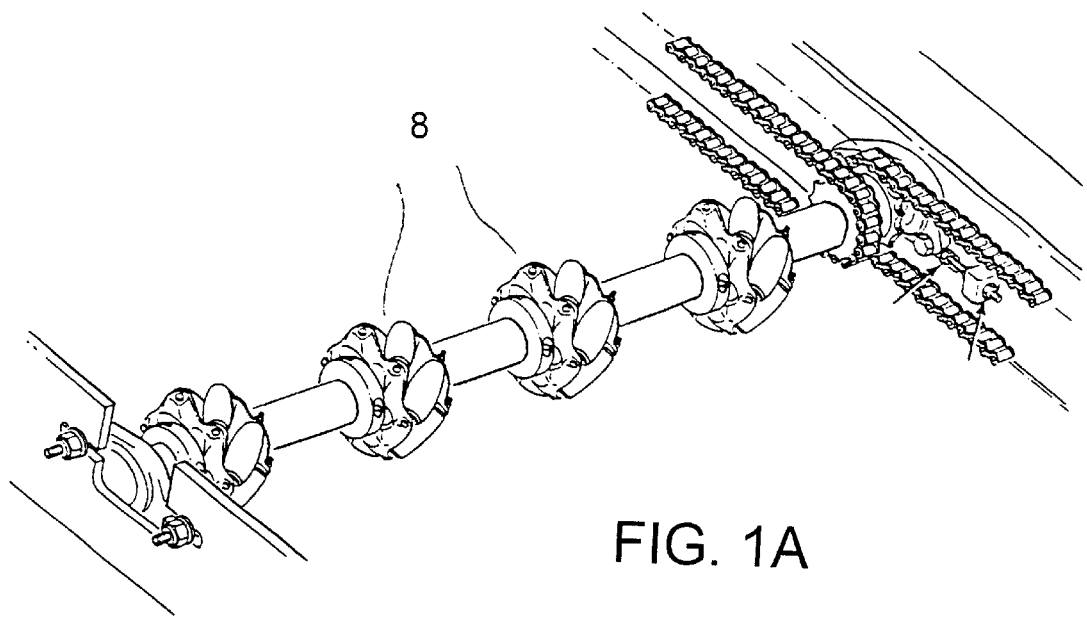
FIG. 1A is a schematic diagram of a transmission set in prior art, showing a plurality of HeliRolls arranged in a drive shaft.
Figure 1B:
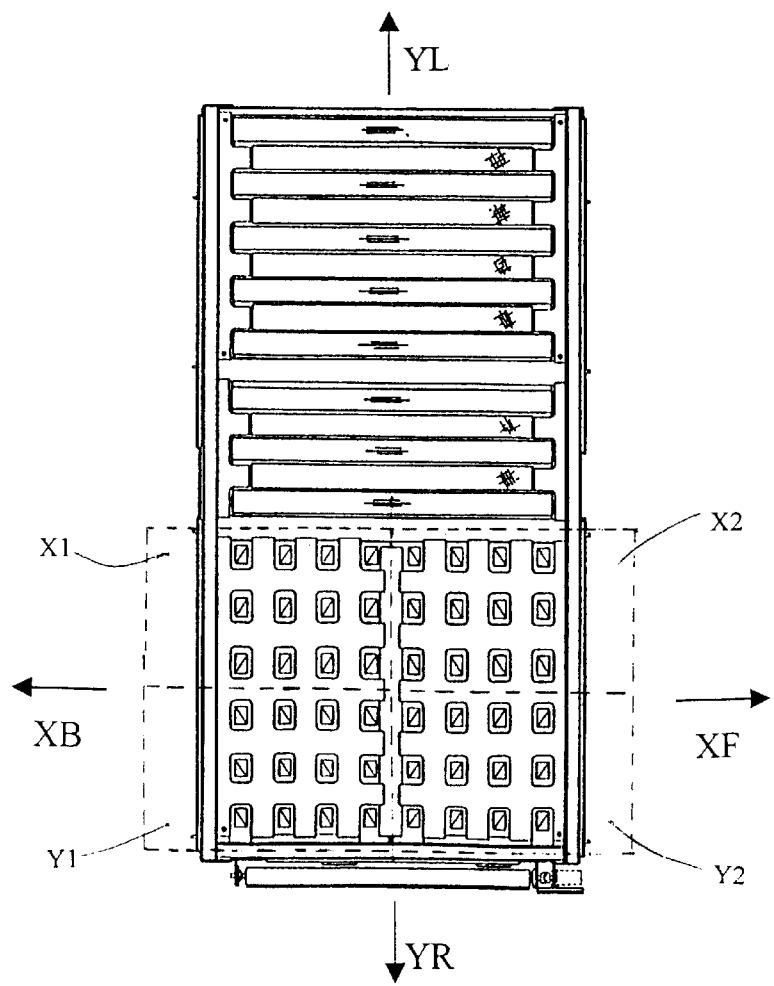
FIG. 1B is a schematic diagram of a transmission apparatus in prior art, in which the HeliRolls oppositely arranged in the adjacent sets in a same plane have been employed.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
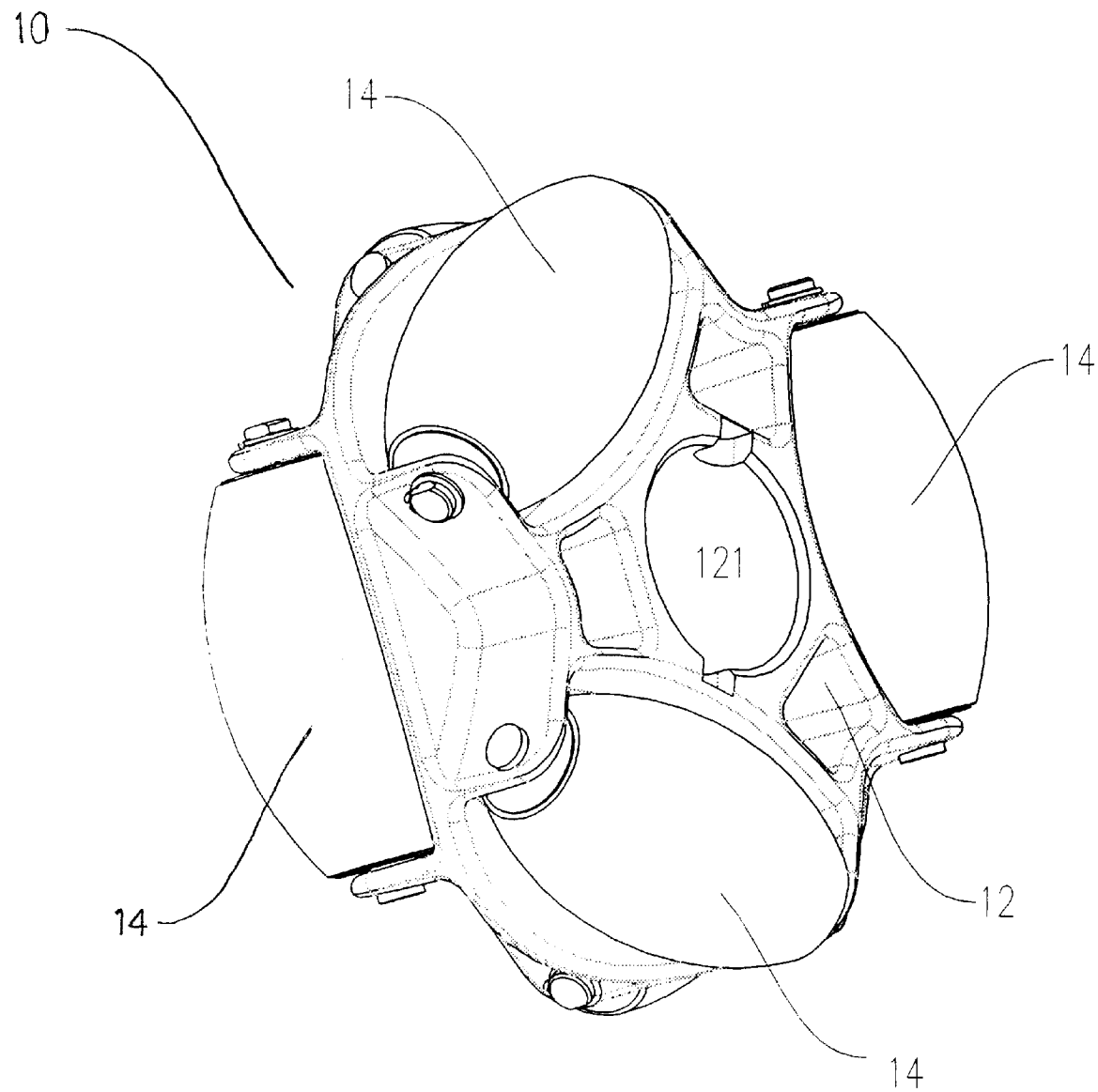
FIG. 2 is a perspective view of a transmission wheel according to the present invention, showing a plurality of ball rollers mounted on both sides of a wheel frame.
Figure 3:
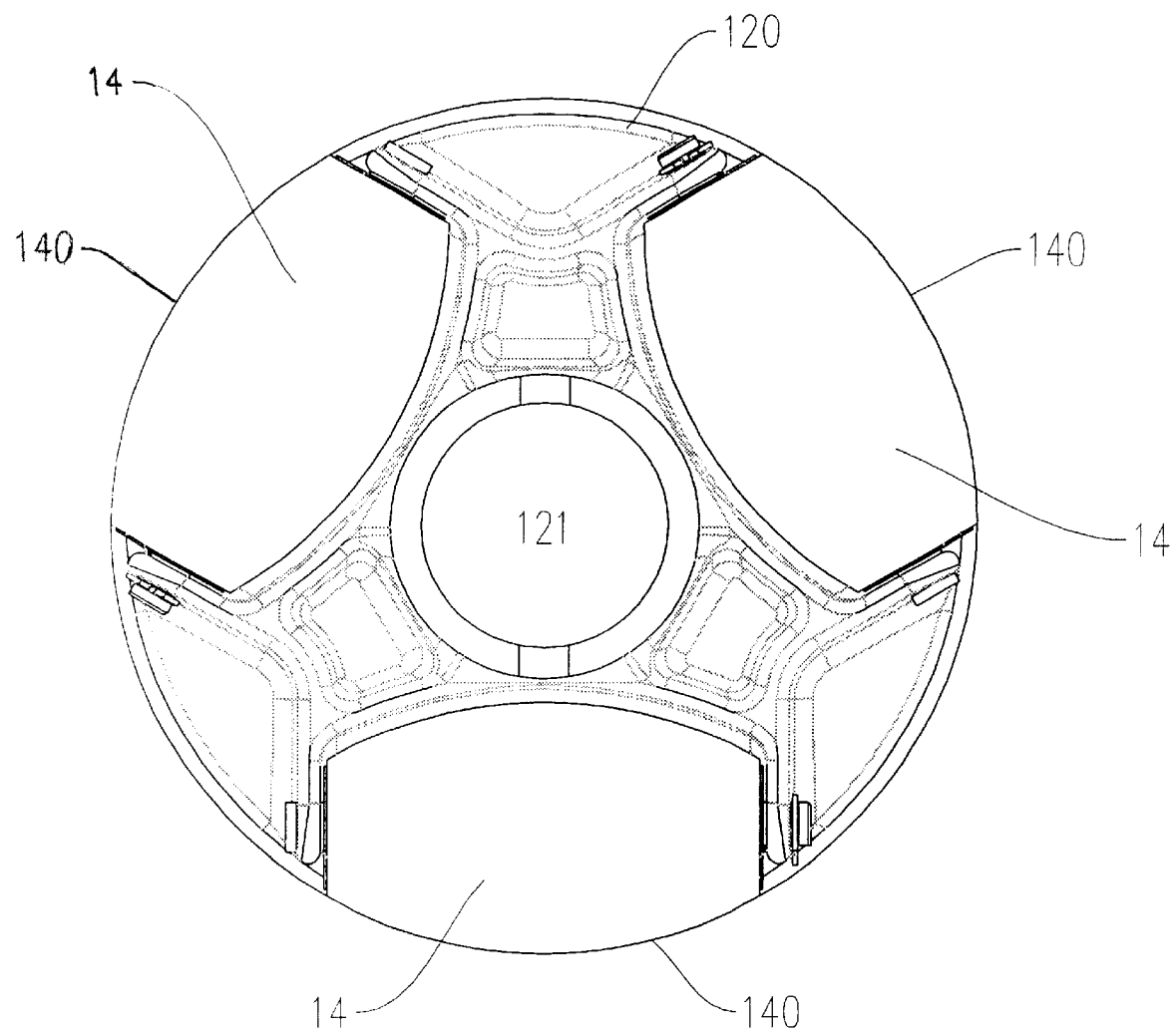
FIG. 3 is a side view of transmission wheel as shown in FIG. 2, in which three evenly arranged ball rollers on a circle of a wheel disk of wheel frame are shown.

A preferred embodiment of a transmission wheel 10 according to the present invention is shown in FIG. 2, it can be seen in the drawing, three identical ball rollers 14 are installed on each side of wheel frame 12 in the transmission wheel 10 respectively. The side view of wheel 10 is shown in FIG. 3, i.e., three ball rollers 14 on each side are evenly arranged on a wheel disk 120 of a wheel frame 12. Obviously, a circular arc camber 140 of the ball roller 14 should be concentrically installed with the circle of the wheel disk 120, and a diameter of a circle formed by the circular arc camber 140 of the ball roller 14 should be greater than that of the circle where the wheel disk is located. More particularly, three ball rollers 14 on one side of wheel disk 120 are separately arranged, corresponding to the spacing between the three equidistant ball rollers 14 on the other side. Furthermore, to realize smooth transmission of the transmission wheel, the circular arc camber 140 of each ball roller should be exactly one sixth of arc length of the circle of a wheel disk 120; thus the circular arc cambers 140 of six ball rollers 14 on both sides of the wheel disk 120 just form a circle, and no discontinuity shall occur in transmission. Preferably, the length of circular arc camber 140 of a ball roller 14 should be designed as slightly greater than one sixth of arc length of the wheel disk 120, thus two adjacent ball rollers 14 on both sides of disk 120 should be mutually overlapped in part, and probable spacing due to installation error etc shall be avoided.

Figure 4:
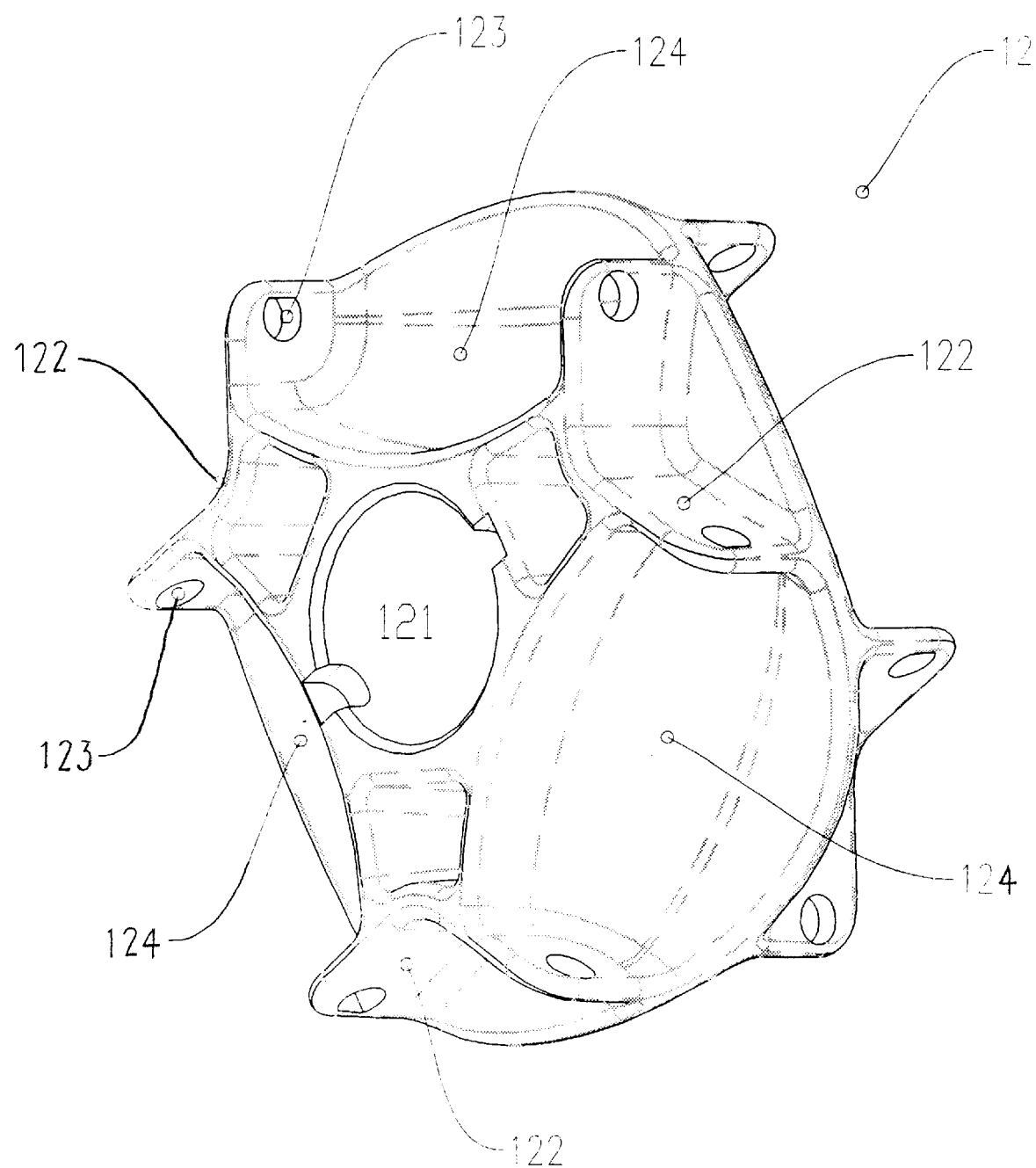
FIG. 4 is an exploded schematic diagram of a transmission wheel according to the present invention, showing a sinking concave surface matching with a ball roller on a wheel frame of the invention.
Figure 5:
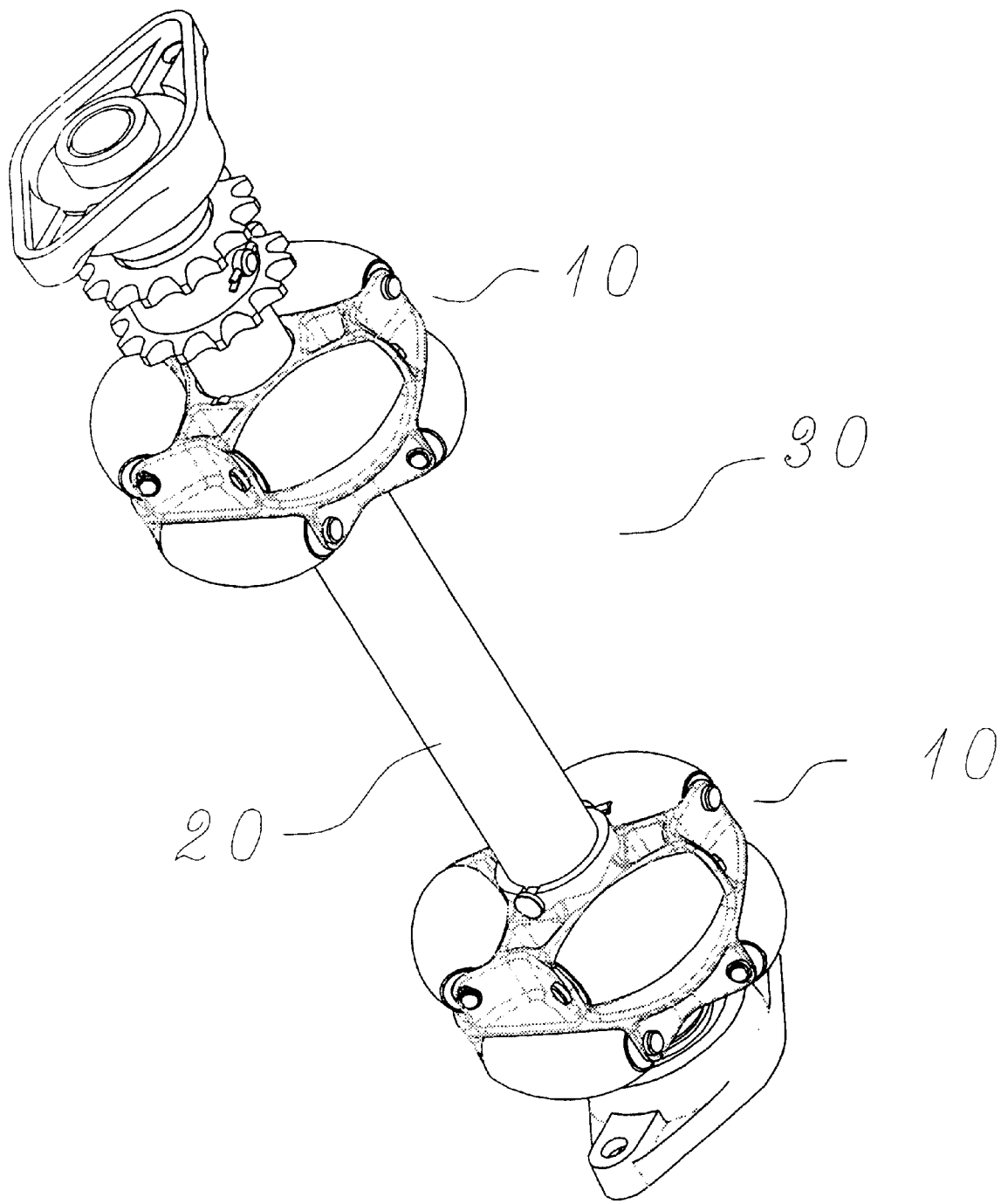
FIG. 5 shows a transmission wheel set of the invention, two transmission wheels shown in FIG. 2 being installed on the wheel set.

The structure of wheel frame of the invention is shown in more detail in FIG. 4. A wheel disk 120 is centered with a through-hole 121 for receiving a drive shaft 20, as shown in FIG. 5. At the same time three stands 122 are integrated with each side of wheel disk 120, and coaxial holes 123 are symmetrically provided on the two wings of the each stand 122 for mounting the axles 141 of the ball rollers 14; thus, the ball rollers 14 of the invention can turn on axles 141, which are fixed axially in the wings by circlips 142 (FIGS. 2 and 3). A concave portion 124 corresponding to the circular arc camber 140 of a ball roller 14, located at the back of each ball roller 14, is provided on both sides of the wheel disk 120, causing the ball rollers 14 on both sides of the wheel frame 12 to be compactly arranged.

Figure 7:
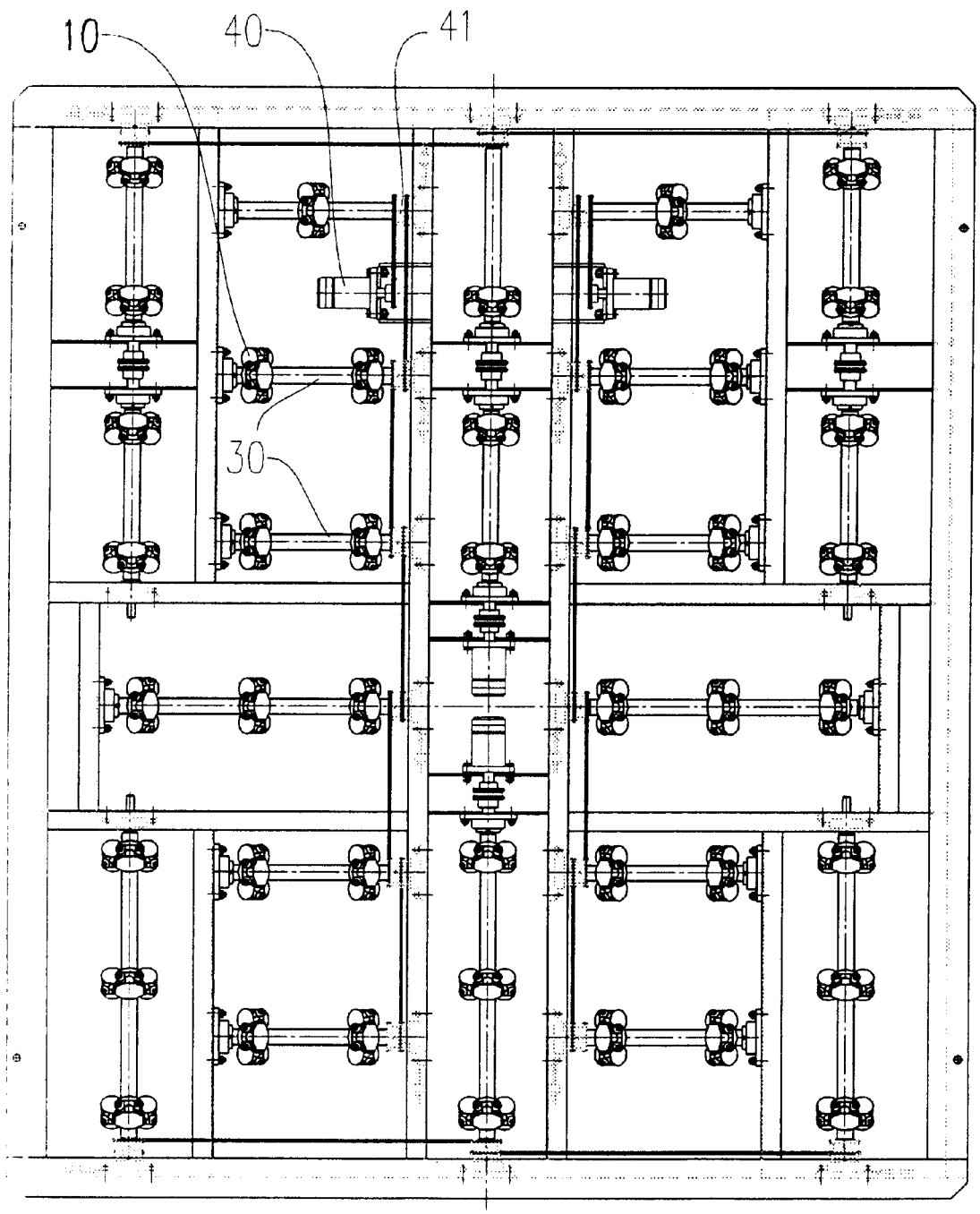
FIG. 7 is a schematic diagram of a preferred embodiment of transmission apparatus according to the present invention.

Through fastening multiple transmission wheels 10 of the invention on a motordriven (not shown) transmission shaft 20, a transmission wheel set 30 is formed, as shown in FIG. 5. In the embodiment, two transmission wheels 10 are fastened on a drive shaft 20 to form a wheel set 30. It should be realized that, according to actual demand, more than two transmission wheels 10 can be fixed on a transmission shaft 20 according to the invention. A platform transmission apparatus of the present invention can be formed by arranging a plurality of wheel sets 30 in a same plane of which axes are mutual perpendicularly installed, as shown in FIG. 7. A transmission apparatus of the invention is driven by a motor 40, and wheel set 30 is driven to rotate by a drive chain 41.

Figure 6:
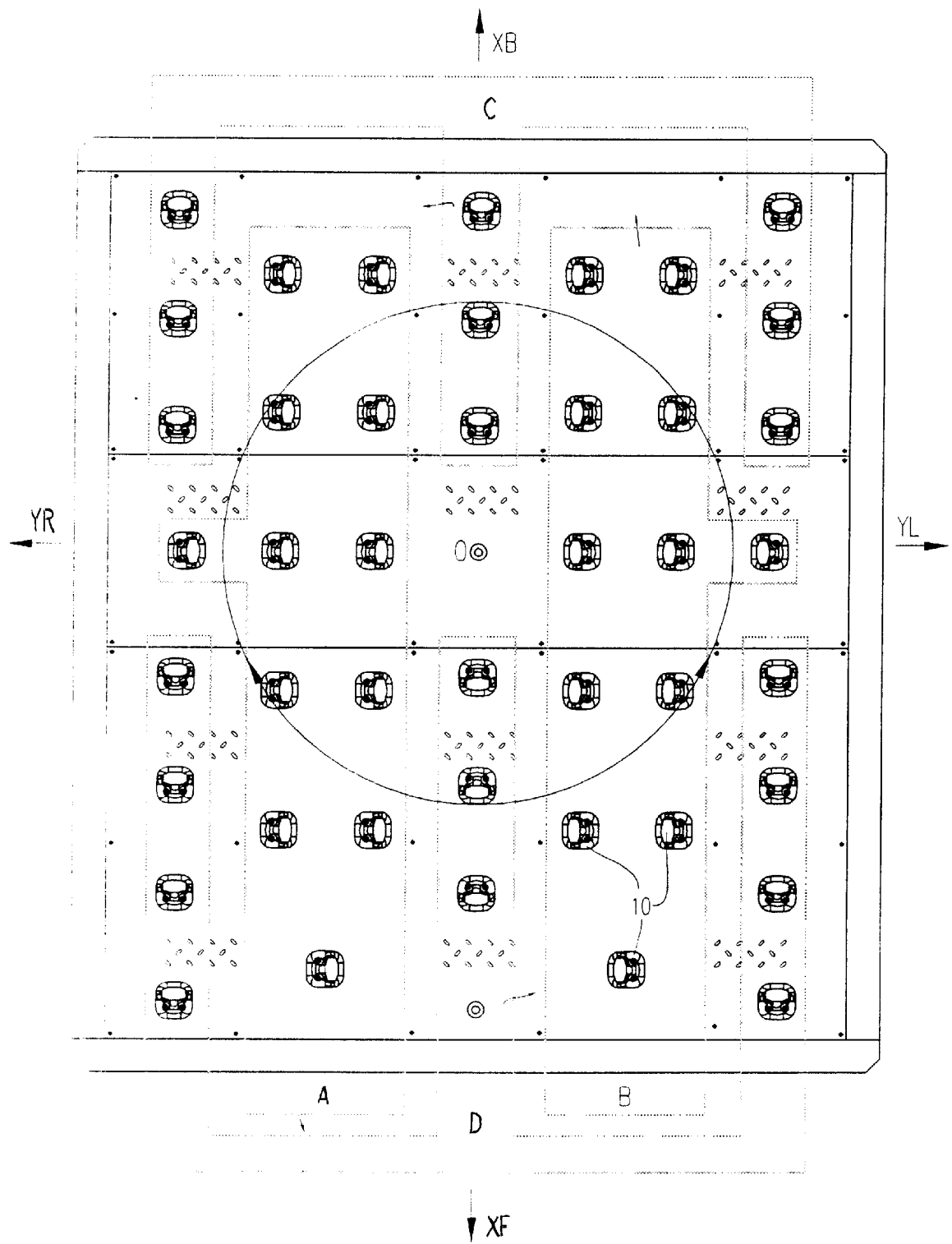
FIG. 6 shows a schematic diagram of combination movements of wheel sets shown in FIG. 5, transmissions on various directions being realized by crisscrossed arrangement of the wheel set combination.

A schematic diagram of the movement of a transmission apparatus in the invention is shown in FIG. 6. Four combinations of wheel sets 30 are arranged in a same plane, i.e. sets A and B serve as longitudinal transmission mechanisms, and sets C and D as lateral transmission mechanisms. When two lateral wheel sets C, D serve as bearing wheels and sets A, B as drive wheels to rotate all in the same direction, the two wheel sets A, B can drive a container or container plates to move in the forward direction (arrow XF) or in the backward direction (arrow XB). At this moment, the movement of supported container plates can rotate the ball rollers 14 arranged on wheels 10 in sets C, D. Since the six ball rollers 14 of the invention are evenly arranged along a circle on a wheel disk 120, the ball rollers 14 can also support the container or container plates to move smoothly. Similarly, when two longitudinal wheel sets A, B serve as bearing wheels, the two wheel sets C, D can drive the container or container plates to move in the right direction (arrow YR) or in the left direction (arrow YL).

With a combination of transmission apparatus in a common plane being designed in accordance with the present invention, rotations of the transmission platform can be realized. Also refer to FIG. 6, when wheels 10 in set A rotate along an arrow XF direction, those in set B rotate along an arrow XB direction, those in set C rotate along an arrow YR direction, and those in set D rotate along an arrow YL direction, the transmission apparatus drives the container or container plates to perform an anti-clockwise rotation around a center O; and vice versa, the container or container plates can perform a clockwise rotation around the center O.

According to actual needs, of course, the invention can employ more ball rollers 14 on each side of a wheel frame 12, for example four, correspondingly, the length of the circular arc camber of each ball roller should be one eighth of the arc length of wheel disk 120.

While the specific embodiments have been illustrated and described, numerous modifications come to mind without significantly departing from the spirit of the invention and the scope of protection is only limited by the scope of the accompanying Claims.

We claim:

1. A transmission wheel comprising a wheel frame centered with a hole, for fastening to a drive shaft and driving cargo, wherein first and second pivotable ball roller means are provided on said wheel frame, in which
    the first pivotable ball roller means comprises several ball rollers which are arranged on several respective supports protuberated axially from said wheel frame, and which are evenly arranged along the circle of circular arc camber of each ball roller; and
    the second pivotable ball roller means comprises several ball rollers which are arranged on several respective supports protuberated axially from said wheel frame, evenly arranged along the circle of circular arc camber of each ball roller and staggered with respect to said several ball rollers of said first ball roller means.

2. A transmission wheel according to claim 1, wherein said wheel frame centered with a hole comprises a wheel disk which is provided between said first and said second ball roller means.

3. A transmission wheel according to claim 2, wherein said supports of said first and said second ball roller means are integrated with said wheel frame.

4. A transmission wheel according to claim 2, wherein a concave portion corresponding to said circular arc camber of said each ball roller. located at the back of said each ball roller, is provided on said wheel disk.

5. A transmission wheel according to claim 1, wherein all circular arc cambers of said several ball rollers which are evenly staggered on two rotatable ball roller means form a circle.

6. A transmission wheel according to claim 4, wherein a circular arc diameter formed by said several ball rollers is greater than that of said wheel disk.

7. A transmission wheel according to claim 6, wherein each pivotable ball rollers means is provided with three ball rollers.

8. A transmission wheel according to claim 7, wherein a length of circular arc camber of said each ball roller is one sixth of arc length of the circle in said wheel disk.

9. A transmission wheel according to claim 8, wherein said length of circular arc camber of said each ball roller is greater than one sixth of arc length of the circle in said wheel disk.

10. A platform transmission apparatus for transmitting on multiple directions comprising
    a platform for bearing transmitted cargo;
    a lift-up mechanism for lifting said platform to a suitable height;
    a lateral transmission mechanism for lateral translation of said platform, comprising a plurality of motor-driven drive shafts on which a transmission wheel is provided by its wheel frame centered with a hole; and
    a longitudinal transmission mechanism for longitudinal translation of said platform, comprising a plurality of motor-driven drive shafts on which said transmission wheel is also provided, wherein first and second pivotable ball roller means are provided on said wheel frame, in which
        the first pivotable ball roller means comprises several ball rollers which are arranged on several respective supports protuberated axially from said wheel frame, and which are evenly arranged along the circle of circular arc camber of each ball roller; and
        the second pivotable ball roller means comprises several ball rollers which are arranged on several respective supports protuberated axially from said wheel frame, evenly arranged along the circle of circular arc camber of each ball roller and staggered with respect to said several ball rollers of said first ball roller means.

11. A platform transmission apparatus according to claim 10, wherein said wheel frame centered with a hole comprises a wheel disk which is provided between said first and said second ball roller means.

12. A platform transmission apparatus according to claim 10, wherein axes of said lateral transmission mechanisms and axes of said longitudinal transmission mechanisms are mutual perpendicularly installed.

* * * * *